United States Patent [19]

Brown

[11] Patent Number: 4,960,463
[45] Date of Patent: Oct. 2, 1990

[54] FLOOR POLISHING COMPOSITION

[75] Inventor: Oliver M. Brown, High Wycombe, England

[73] Assignee: S. C. Johnson & Son, Inc., Racine, Wis.

[21] Appl. No.: 418,953

[22] Filed: Oct. 6, 1989

Related U.S. Application Data

[60] Continuation of Ser. No. 224,956, Jul. 27, 1988, abandoned, which is a division of Ser. No. 46,324, May 6, 1987, abandoned.

[30] Foreign Application Priority Data

May 23, 1986 [GB] United Kingdom ............... 8612589

[51] Int. Cl.$^5$ ........................... C09G 1/04; C09G 1/00
[52] U.S. Cl. ........................................ 106/11; 106/3; 524/244; 524/245; 524/247; 524/249
[58] Field of Search ................ 106/3, 11; 524/245, 524/244, 247, 249

[56] References Cited

U.S. PATENT DOCUMENTS

| | | | |
|---|---|---|---|
| 3,554,790 | 1/1971 | Gehman et al. ................ | 106/11 |
| 3,960,575 | 6/1976 | Martin ............................. | 106/11 |
| 4,163,673 | 8/1979 | Dechert .......................... | 106/11 |
| 4,168,255 | 9/1979 | Lewis et al. .................... | 524/914 |
| 4,347,333 | 8/1982 | Lohr et al. ..................... | 106/10 |

*Primary Examiner*—Paul Lieberman
*Assistant Examiner*—Christine A. Skane

[57] ABSTRACT

An aqueous polish composition comprising a polymeric polish material and an alkoxylated amine sulfactant is disclosed. Also disclosed is a method of making the aqueous polish composition as well as a method of using an alkoxylated amine surfactant to improve selected physical properties of a polymeric polish material.

2 Claims, No Drawings

FLOOR POLISHING COMPOSITION

This is a continuation of co-pending application Ser. No. 07/224,956 filed on July 27, 1988 which, in turn, is a division of Ser. No. 07/046,324, filed May 6, 1987 (now abandoned).

REFERENCE TO RELATED APPLICATION

This application is a U.S.-filed counterpart of British Patent Application No. 8,612,589 (filed May 23, 1986), the benefit of which is now claimed for purposes of priority pursuant to 35 U.S.C. §119.

FIELD OF THE INVENTION

This invention relates to polishing compositions, particularly floor polishes and polish cleaners. Polishing compositions—particularly those for floors—generally comprise a dispersion, in an aqueous medium, of at least one polymer and/or polymeric ingredient. In such an aqueous dispersion, these ingredients are typically emulsified or otherwise stabilized, often utilizing a variety of well-known surfactants and/or other types of dispersing agents.

BACKGROUND OF THE INVENTION

Among the dispersible emulsifing agents typically employed are certain well-known polyethoxy surfactants, such as the nonyl phenol ethoxylates. While a great many of these polyethoxy surfactants are presently commercially available, experience with several types of these has not demonstrated any significant advantage of one over another—at least in relation to the desired, ultimate properties of a polish film.

The success of a polish film is often determined from a variety of physical properties, such as: (1) the gloss of the polish film after application onto a substrate and drying; (2) the apparent "smoothness" of the polished surface (i.e., the intensity or "brightness" of the polish-applied substrate in relation to the amount of film-leveling that is utilized to achieve such a result) after the surface-applied film has been allowed to dry; (3) the "resistance-to-soil" quality of the polish; and (4) the perceived depth or "thickness" of the polish film that is formed. The term "the depth of the polish" is herein defined as yet another type or form of an empirical perception of the polish layer on the substrate.

Surprisingly, it has now been found that alkoxylated amine surfactants unexpectedly improve gloss, leveling, and cleaning, as well as soil resistance of polish films. Indeed, there was not even a suggestion in the literature (i.e. the prior art did not teach) that such surfactants would have any effect whatsoever upon improving the properties of the applied polish film. (The alkoxylated amine surfactants, perhaps not co-incidentally, are generally more expensive than a vast majority of those types of surfactants which are typically favored in commercial polishes.) Yet it has been discovered—and the present invention illustrates—that the above-mentioned alkoxylated amine surfactants can be used in addition to, or as replacement for, a variety of ingredients (such as stabilizers, cleaning agents and emulsifiers) that are currently typically included in commercial polish compositions. In particular, the present invention illustrates that certain alkoxylated amine surfactants can be used as a replacement for one commercially-available non-ionic surfactant, which itself functions not only as a stabilizer and cleaning agent but also as an emulsifier as well.

It has further been discovered, where use of a surfactant in an intermediate composition results in the presence of such surfactant in the ultimate composition, that replacement of many of the conventional surfactant ingredients—i.e., substitution of the alkoxylated amine surfactant of the present invention in place thereof—tends to improve the ultimate composition as well. For example, it has been observed that the ultimate composition when applied onto a substrate as a film exhibits, among other things, superior soil resistance, enhanced gloss values, enhanced depth of gloss, and superior leveling properties. It can therefore be appreciated that the alkoxylated amine surfactants of the present invention can be used in a variety of commercial polymer products such as wax-based or resin-containing polish-composition intermediates.

SUMMARY OF THE INVENTION

Therefore, in accordance with the present invention, there is provided an aqueous polish composition comprising a polymeric polish material, and an alkoxylated amine surfactant.

In a preferred embodiment of the invention, the alkoxylated amine surfactant is an ethoxylated amine surfactant.

In a more preferred embodiment, the alkoxylated amine surfactant is an ethoxylated fatty amine surfactant. A "fatty amine" is herein defined as an alkyl chain of about 4 to about 40 carbon atoms, wherein the chain includes at least one amino group.

Methods of preparing the aqueous polish composition, as well as methods of utilizing an alkoxylated amine surfactant to improve selected physical properties of the polymeric polish material, are disclosed hereinbelow.

DETAILED DESCRIPTION OF THE PREFERRED EMBODIMENTS

While the present invention is susceptible to embodiment in various forms, there are hereinafter described in detail presently preferred embodiments of the present invention, with the understanding that the present disclosure is to be considered as an exemplification of the invention without limitation to the specific embodiments discussed.

According to the invention, there is provided an aqueous polish composition comprising a polymeric polish material, and an alkoxylated amine surfactant.

One such polymeric polish material, suitable for purposes of the present invention, is referred to in the art as an "acrylic co-polymer". Suitable commercially-available acrylic emulsion co-polymers, for purposes of the present invention, include, but are not limited to, co-polymers produced from one or more of the following monomers: acrylic acid, butyl acrylate, ethyl acrylate, methyl acrylate, 2-ethyl hexyl acrylate (2-EHA), acrylonitrile, acrylamide, methacrylic acid, methyl methacrylate, ethyl methacrylate, butyl methacrylate, methacrylamide, and the like. Particularly suitable commercially-available acrylic co-polymers, for purposes of the present invention, include, but are not limited to, methyl methacrylate/butyl acrylate/methacrylic acid (i.e., MMA/BA/MAA) co-polymer, methyl methacrylate/butyl acrylate/acrylic acid (i.e., MMA/BA/AA) co-polymer, and the like.

Another such polymeric polish material, suitable for purposes of the present invention, is referred to in the art as a "styrene-acrylic co-polymer". Suitable commercially-available styrene-acrylic co-polymers, for purposes of the present invention, include, but are not limited to, co-polymers produced from one or more of the following monomers: styrene, alpha-methyl styrene, and the like. Particularly suitable commercially-available styrene-acrylic co-polymers, for purposes of the present invention, include, but are not limited to, styrene/methyl methacrylate/butyl acrylate/methacrylic acid (i.e., S/MMA/BA/MAA) co-polymer, styrene/methyl methacrylate/butyl acrylate/acrylic acid (i.e., S/MMA/BA/AA) co-polymer, and the like.

In one preferred embodiment of the invention, the alkoxylated amine surfactant is an ethoxylated amine surfactant. In a more preferred embodiment, the alkoxylated amine surfactant is an ethoxylated fatty amine surfactant.

One method of using an alkoxylated amine surfactant—such as the alkoxylated amine surfactants disclosed herein—for improving selected physical properties of a polymeric polish material contemplates combining with the polymeric polish material an effective amount of such alkoxylated amine surfactant for producing a polishing composition that is able to provide improved gloss values, superior level-surface values, enhanced depth-of-gloss values, superior overall-appearance values, and superior resistance to black heel marking, when the polishing composition is applied, for example, onto a substrate in the form of a relatively thin film. Such a film has been observed to possess gloss, level-surface, and depth-of-gloss values that are a noticeable improvement over that which is achieved utilizing conventional polish compositions.

Moreover, one method of preparing or otherwise manufacturing such a polishing composition that possesses or otherwise exhibits improved selected physical properties, wherein the polishing composition includes a polymeric polish material, contemplates combining with the polymeric polish material an amount of alkoxylated amine surfactant—such as the alkoxylated amine surfactants disclosed herein—that is sufficient to produce such a polishing composition. In particular, such a polishing composition is able to provide gloss, level-surface, and depth-of-gloss values that are a noticeable improvement over what is achieved utilizing conventional polish compositions.

The alkoxylated amine surfactants that are utilized in this invention are commercially available. Such alkoxylated amine surfactants comprise compounds in which a nitrogen atom has attached thereto one or more polyalkoxy chains. Such polyalkoxy chains may be derived, for example, via condensation of alkylene oxides; or they may be purchased commercially (as mentioned above).

The alkoxylated amines can be primary, secondary, or tertiary, so that a nitrogen atom can be substituted by up to 3 alkoxy groups, as shown hereinbelow. (It is contemplated, moreover, that quaternary amines would be suitable, for purposes of the present invention, as well.)

Each alkoxy group, furthermore, may have from 1 to about 4 carbon atoms.

The nitrogen can also be substituted by other groups which should, of course, not interfere with the surfactant properties of the thus-substituted alkoxylated amine surfactant. It is further contemplated that such other groups might even further enhance the desired surfactant properties of the thus-substituted alkoxylated amine surfactant.

Typical alkoxylated amine surfactants, in accordance with the principles of the present invention, include those of the following formulae:

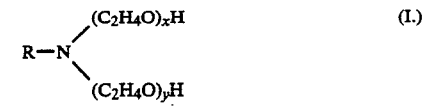

(I.)

(II.)

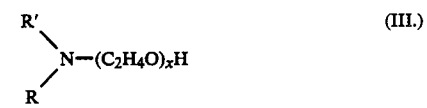

(III.)

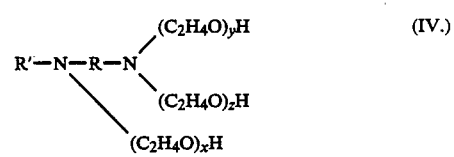

(IV.)

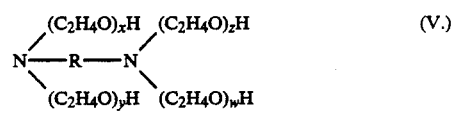

(V.)

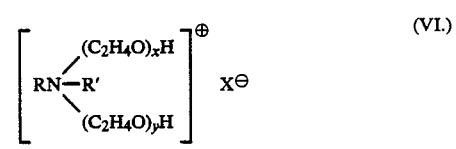

(VI.)

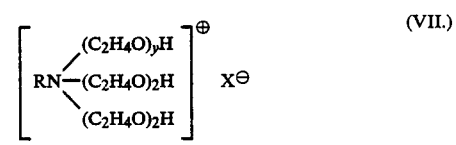

(VII.)

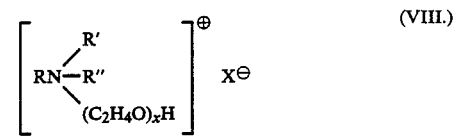

(VIII.)

wherein R, R' and R" can each be hydrogen or an alkyl radical, each of which alkyl radicals typically comprise about 1 to about 30 carbon atoms; wherein each of w, x, y and z is an integer of from about 1 to about 15; wherein at least one of w, x, y and z is the integer 2 or greater; and wherein $X^{\ominus}$ is a negatively charged anion, typically a halogen such as fluorine, chlorine or bromine, or another negatively charged anion such as sulfate, and the like.

The polishes into which these surfactants can be incorporated typically contain a variety of commercially available polymers, usually dispersed in water or other aqueous media or systems. Moreover, such polishes can additionally contain a variety of other ingredients, such as dispersing agents, waxes, anti-slip agents, leveling resins, preservatives, perfumes, and a variety of yet other conventional components of wax polishes.

The invention will now be further discussed by way of the following examples:

EXAMPLE 1

One Illustrative Aqueous Polish Composition

| Component | Parts by weight |
|---|---|
| Zinc Ammonium Carbonate[a] | 2.288 |
| Emulsified Styrene/Acrylic Co-polymer[b] | 29.328 |
| Oxidized Polyethylene Wax Emulsion[c] | 5.473 |
| Preservative | 0.05 |
| Tributoxyethyl Phosphate | 1.118 |
| Fluorochemical Wetting Agent[d] | 0.048 |
| Coalescent Solvent[e] | 1.013 |
| Water | 57.396 |
| Perfume | 0.2 |
| Ethoxylated fatty amine surfactant | 3.086 |
| TOTAL | 100.000 |

[a]Carbonate is contained in a 15% by weight aqueous solution.
[b]Co-polymer contains at least about 35% polymer solid by weight.
[c]Emulsion contains about 34% by weight solids
[d]Wetting agent includes about 50% actives by weight.
[e]Glycol ethers are a typical family of one such coalescent solvent.

The ethoxylated fatty amine surfactant of EXAMPLE 1 is a mixture, in equal amounts, of 2 ethoxylated fatty amine surfactants, each of which has the formula

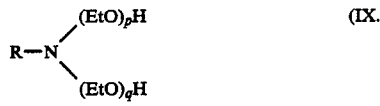  (IX.)

wherein one component of the mixture has a "p+q" value of about 5 moles of ethylene oxide condensed with the primary amine and wherein the other (component of the mixture has) a "p+q" value of about 20 moles of ethylene oxide (condensed with the primary amine); wherein R is a mixture of 13-carbon and 15-carbon atom-containing alkyl groups in an approximate weight ratio of about 70:30; and wherein approximately 50% of the alkyl groups are linear, the balance of the alkyl groups comprising branched species or moieties.

EXAMPLE 2

A Conventional Polish Composition

Another floor polish was prepared, utilizing a composition virtually identical to that of EXAMPLE 1, except that in place of the ethoxylated fatty amine surfactant mixture there was added an equivalent amount of nonyl phenol polyethoxy surfactant, a commercially-available polyethoxy surfactant in this field.

As compared to the floor polish of EXAMPLE 2 (which was utilized as a so-called "control" or "standard"), the floor polish of EXAMPLE 1 provided considerably improved gloss, more level surface, and a superior depth of gloss as well. These properties were measured utilizing standarized laboratory tests (established for this purpose). Moreover, in accordance with these standard testing procedures, the polishes (of EXAMPLES 1 and 2) were applied—in a substantially identical manner (relative to each other)—onto typical test surfaces that corresponded to actual floor surfaces.

EXAMPLE 3

Another Illustrative Aqueous Polish Composition

Another aqueous polish composition, in accordance with the principles of the present invention, was formulated in a manner so as to have its components present in virtually the same relative ratios as is presented above in EXAMPLE 1, except that instead of the ethoxylated fatty amine surfactant mixture of EXAMPLE 1 being present, a weight equivalent amount of a commercially-available primary amine ethoxylate containing 10 moles of ethylene oxide was included in the composition.

The floor polish of EXAMPLE 3 was also observed to provide gloss, level-surface, and depth-of-gloss values, all of which were notably improved over those provided by the conventional polish composition of EXAMPLE 2.

Comparison of the polish compositions of EXAMPLES 1-3 is illustrated by way of the below-presented tabulated data.

In particular, in one series of tests, jet-black, thermoplastic test floor surfaces were employed as the substrate; and one coat (Table I) as well as two coats (Table II) of the polish compositions of EXAMPLES 1-3 were applied onto the thermoplastic floor surfaces.

TABLE I

One Coat of Polish on the Thermoplastic Floor

| | Polish Ratings of | | |
|---|---|---|---|
| Tested for | Example 1 | Example 2 | Example 3 |
| Gloss[f] | 8 | 6 | 9 |
| Leveling[g] | 8 | 7–8 | 9 |
| Depth of Gloss[h] | 9 | 6 | 9 |
| Overall Appearance[i] | 8–9 | 6 | 9 |
| 60 Degree Specular Gloss[j] | 33.3 | 22.9 | 33.5 |

[f]Testing procedure employed was modeled after standard testing procedure ASTM [American Society for Testing and Materials] D3052-82.
[g]Testing procedure employed was modeled after standard testing procedure ASTM D3153-78 (1986).
[h]Testing procedures employed were modeled after standard testing procedures ASTM D3052-82 and D3751-79 (1985).
[i]Testing procedure employed was modeled after at least one of the following, well-known standard testing procedures: ASTM D3751-79 (1985), ASTM D3052-82, ASTM D3153-78 (1986), and/or ASTM D1455-82.
[j]The reported value is an average of 10 observations. The testing procedures employed were modeled after standard testing procedures ASTM D1455-82 and ASTM D523-85

TABLE II

Two Coats of Polish on the Thermoplastic Floor

| | Polish Ratings of | | |
|---|---|---|---|
| Tested for | Example 1 | Example 2 | Example 3 |
| Gloss[f] | 9 | 5 | 9 |
| Leveling[g] | 8 | 3 | 8 |
| Depth of Gloss[h] | 9 | 4 | 8–9 |
| Overall Appearance[i] | 9 | 4 | 8–9 |
| 60 Degree Specular Gloss[j] | 57.1 | 43.1 | 55.4 |

[f-j]Same as above.

Also, blue, vinyl test floor surfaces were employed as another such substrate; and one coat (Table III) as well as two coats (Table IV) of the polish compositions of EXAMPLES 1-3 were likewise applied onto the vinyl floor surfaces as well.

TABLE III

One Coat of Polish on the Vinyl Floor

| | Polish Ratings of | | |
|---|---|---|---|
| Tested for | Example 1 | Example 2 | Example 3 |
| Gloss[f] | 9 | 6 | 8–9 |
| Leveling[g] | 9 | 7 | 9 |
| Depth of Gloss[h] | 9 | 6 | 9 |
| Overall Appearance[i] | 9 | 6 | 8–9 |
| 60 Degree Specular Gloss[j] | 30.4 | 22.0 | 28.6 |

[f-j]Same as above.

TABLE IV

Two Coats of Polish on the Vinyl Floor

| Tested for | Polish Ratings of | | |
|---|---|---|---|
| | Example 1 | Example 2 | Example 3 |
| Gloss$^f$ | 9 | 6 | 8-9 |
| Leveling$^g$ | 8 | 4 | 8 |
| Depth of Gloss$^h$ | 9 | 5 | 9 |
| Overall Appearance$^i$ | 9 | 5 | 9 |
| 60 Degree Specular Gloss$^j$ | 47.1 | 37.9 | 47.1 |

$^{f-j}$Same as above.

TABLE V

Standard White Test Tile (CSMA Bulletin 9-73)

| Tested For | Polish Ratings of | | |
|---|---|---|---|
| | Example 1 | Example 2 | Example 3 |
| Black Heel Marking$^k$ | 8 | 7 | 7-8 |

$^k$Testing procedure employed was modeled after standard testing procedure CSMA [Chemical Specialities Manufacturers Association] Bulletin 9-73.

TABLE VI

Soiled Vinyl Substrate

| Tested For | Polish Ratings of | | |
|---|---|---|---|
| | Example 1 | Example 2 | Example 3 |
| Cleaning Test$^l$ | 5 | 3-4 | 4-5 |

$^l$The test term "Hard Surface Cleaning", as employed herein, is more particularly described hereinbelow. (Cleaning test is at a 1:20 dilution factor.)

The black thermoplastic and blue vinyl test floors were prepared as follows.

Test floor surfaces to be treated were stripped of all previous polish (that might be present) by machine-scrubbing with a commercially-available industrial-strength alkali-containing floor-polish stripper solution.

The test floor surfaces were next rinsed thoroughly with clean water, and thereafter allowed to dry. Each test floor surface (i.e., "test substrate") was then marked out into three adjacent test areas; and a polish composition of each of EXAMPLES 1-3 was then applied, by hand, to a respective one of each of the three test substrates. Such hand application employed commercially-available polish applicator pads; and each such polish composition was applied at approximately 20 milliliters per square meter.

For those test results that present two-coat data (i.e., Tables II and IV, above), the first coat of polish was allowed to dry overnight before the second coat was applied. In particular, application of the second coat was performed generally as described above for the first coat excluding, of course, the polish stripping step that was performed to "prepare" the surface. Otherwise, for those tests that present one-coat data (i.e., Tables I and III), the coat of polish was allowed to dry thoroughly (i.e., about 3 hours) before the coating was evaluated visually.

All visually-assessed performance ratings were scored on a comparative scale, i.e., relative to each other. As to the values "0" through "10", a value of "0" was indicative of very poor performance and a value of "10" was indicative of excellent performance. In particular, this was the criteria utilized to evaluate the "gloss", "leveling", "depth of gloss", "overall appearance", and "black heel marking" tests.

As to the 60 Degree Specular Gloss values, it is to be understood that Gloss unit values are objective in nature when performed on a glossmeter. Accordingly greater values demonstrate increasing or more-brilliant gloss, which is a desirable result.

Some of the test terms employed in the above-presented tables will now briefly be explained in greater detail.

The test term "depth of gloss" relates, in general, to the perceived "jetness" (i.e., blackness or darkness) of the substrate-applied film.

The test term "leveling" relates not only to the perceived evenness of the applied coating (i.e., the applied polish composition film), but the term also relates to the perceived lack of streaking of the substrate-applied coating.

The test term "overall appearance" is an overall visual composite rating of the performance of the polish, and includes the gloss, the leveling, and the depth-of-gloss factors.

The test term "specular" relates, in general, to the mirror-like or reflective property of the substrate-applied film.

The Specular Gloss of the polish films was measured using a commercially-available so-called "BYK-Mallinckroft" 60 Degree pocket glossmeter. Readings were taken across the entire treated floor surface, and the readings were thereafter averaged.

The "Hard Surface Cleaning" test method is briefly described as follows.

A standard mineral soil composition was prepared, in accordance with the recipe set forth below in Table VII.

TABLE VII

Standard Mineral Soil Composition

| Ingredients | Parts by Weight |
|---|---|
| Black Ferric Oxide | 18.92 |
| Silicon Dioxide | 7.41 |
| Spindle Oil$^m$ | 6.58 |
| Calcium Sulfate | 2.82 |
| Aluminum Oxide | 2.82 |
| Carbon Black | 0.21 |
| White Spirit$^n$ | 61.24 |
| TOTAL | 100.00 |

$^m$"Spindle Oil" is a well-known commercially-available low-viscosity lubricating oil, typically used for textile and other high-speed machinery.
$^n$"White Spirit" is a commercially-available blend of aliphatic hydrocarbons, and is similar to "Stoddard Solvent". See e.g., The Handbook of Chemical Synonyms and Tradenames, 9th edition. published by the CRC Press. Inc., of Boca Raton, Florida (bearing copyrights of 1968, 1971 and 1978 owned by The Technical Press, Ltd., Oxford, England), at page 663.

The polish compositions of EXAMPLE 1-3 were combined with water to produce so-called "cleaning solutions", by diluting 1 part by weight of one of the three polish compositions with 19 parts by weight of cold tap water. Such dilution is conventionally—and is herein explicitly—written as 1:20.

A portion of the prepared standard mineral soil composition was then evenly coated onto a white, textured, commercially-available, industrial-quality, wall covering material, using a conventional paint roller. The thus-soiled vinyl test substrate was then allowed to dry for a minimum of 3 days.

A piece of fine-grade nylon cleaning pad, measuring 1.5 by 3.5 inches, was attached to a commercially-available, straight-line washability-and-abrasion machine (a so-called "Gardner Scrub-Test" machine), and was fitted with the soiled-and-dried vinyl test substrate and the nylon pad-attached rectangular wooden block. Next, 10 milliliters of one of the above-prepared aqueous cleaning solutions was applied to the pad. Thereafter, the washability-and-abrasion machine was activated and the cleaning-solution-bearing pad was scrubbed across the soiled vinyl test sheet for twenty cycles. After that, the vinyl test sheet was removed from the machine, was rinsed with clean water, and was allowed to dry.

Visual assessment of comparative cleaning performance, as between the polish compositions of EXAMPLES 1-3, was carried out in a substantially identical manner and was rated on a 0-to-10 scale. That is, a "0" rating was indicative of virtually no removal of soil, while a "10" rating was indicative of substantially complete removal of soil.

The cleaning solution prepared from the polish composition of EXAMPLE 2 was designated as the "control", for experimental purposes, and was used to compare—in a relative fashion—the hard-surface-cleaning characteristics of the polish compositions of EXAMPLES 1 and 3 relative to EXAMPLE 2, Table IV (above) presents not only the results of the so-called "cleaning" tests but also the results of the so-called "black heel marking" tests as well.

What has been described herein as an invention is a novel polishing composition. While the polishing composition of the invention has been described with reference to preferred embodiments, the invention is not limited thereto. On the contrary, also disclosed as an invention, is a method of making the composition as well as a method of using an alkoxylated amine surfactant to improve selected physical properties of a polymeric polish material. Accordingly, alternatives, changes or modifications will become apparent to those skilled in the art upon reading the foregoing description. Moreover, such alternatives, changes and modifications are to be considered as forming a part of the invention insofar as they fall within the spirit and scope of the appended claims.

I claim:

1. In a method for using a polishing composition comprising a polymeric material and a surfactant, wherein the polymeric material provides the polishing composition, upon being applied to a substrate, with determinable physical properties, wherein said surfactant is an alkoxylated amine surfactant for improving said substrate-applied polishing composition physical properties, wherein the improvement method comprises:

combining with a polymeric material produced from a monomer selected from the group consisting of acrylic acid, butyl acrylate, ethyl acrylate, methyl acrylate, 2-ethyl hexyl acrylate, acrylonitrile, acrylamide, methacrylic acid, methyl methacrylate, ethyl methacrylate, butyl methacrylate, methacrylamide, styrene, alpha-methyl styrene, and combinations thereof, an effective amount of an alkoxylated alkyl amine surfactant having an alkyl chain of about 4 to about 40 carbon atoms and a nitrogen atom that can be substituted by 1, 2 or 3 alkoxy groups, each such alkoxy group having from 1 to about 4 carbon atoms, for producing a polishing composition that, upon being applied in the form of a film onto the substrate, possesses determinable 60 Degree Specular Gloss, level-surface, and depth-of-gloss values, wherein the amount of the alkoxylated alkyl amine surfactant relative to the amount of the polymeric material is effective for thus providing the substrate-applied film with said 60 Degree Specular Gloss, level-surface, and depth-of-gloss values and applying said composition to said substrate.

2. The method in accordance with claim 1 wherein the alkoxylated alkyl amine surfactant is an ethoxylated alkyl amine surfactant.

* * * * *